(12) United States Patent
Rasmussen

(10) Patent No.: US 6,344,258 B1
(45) Date of Patent: Feb. 5, 2002

(54) HEAT-SEALING POLYMER FILMS

(76) Inventor: Ole-Bendt Rasmussen, Sagenstrasse 12, CH-6318 Walchwil/Zug (CH)

( * ) Notice: Subject to any disclaimer, the term of this patent is extended or adjusted under 35 U.S.C. 154(b) by 0 days.

(21) Appl. No.: 09/308,576

(22) PCT Filed: Nov. 20, 1996

(86) PCT No.: PCT/EP97/06495

§ 371 Date: May 21, 1999

§ 102(e) Date: May 21, 1999

(87) PCT Pub. No.: WO98/23434

PCT Pub. Date: Jun. 4, 1998

(30) Foreign Application Priority Data

Nov. 22, 1996 (GB) .............................................. 9624322

(51) Int. Cl.$^7$ ................................................. B32B 3/00
(52) U.S. Cl. ................... 428/174; 156/312; 156/583.4; 206/521; 383/107
(58) Field of Search .............................. 156/583.4, 312, 156/247; 206/521; 383/107, 108; 428/174

(56) References Cited

U.S. PATENT DOCUMENTS

| | | | | |
|---|---|---|---|---|
| 2,735,797 A | * | 2/1956 | Schjeldahl | 383/107 |
| 2,979,113 A | * | 4/1961 | Stageberg | 383/108 |
| 3,379,595 A | * | 4/1968 | Bracey, Jr. | 156/306 |
| 3,889,870 A | * | 6/1975 | Bender | 383/107 |
| 3,960,636 A | * | 6/1976 | Moffitt | 156/290 |
| 4,010,783 A | * | 3/1977 | Ralston | 206/521 |
| 4,076,063 A | * | 2/1978 | Cammarata, III et al. | 383/107 |
| 4,105,730 A | * | 8/1978 | Cammarata, III et al. | 264/89 |
| 4,135,957 A | * | 1/1979 | Voller | 383/107 |
| 4,390,384 A | * | 6/1983 | Turner | 156/211 |
| 4,735,675 A | * | 4/1988 | Metz | 156/583.4 |
| 4,770,295 A | * | 9/1988 | Carveth et al. | 206/219 |
| 5,912,197 A | * | 6/1999 | Madderom | 442/305 |

FOREIGN PATENT DOCUMENTS

GB        943457 A     * 12/1963

* cited by examiner

Primary Examiner—Stephen P. Garbe
(74) Attorney, Agent, or Firm—William J. Daniel

(57) ABSTRACT

Apparatus for heat-sealing polymer films which shrink when heated include provision for moving the zone of application of heat and pressure during the heat sealing process. This allows for shrinking of the polymer film in a region adjacent to the heat seal so that the film thickens and is more resistant to failure in use through peeling. The apparatus includes a pair of sealing bars (4, 5) one of which (4) is wedge-shaped and the other of which (5) is flat. Both bars are heated and one of them can be moved in direction (12) to apply pressure to film located between the bars. At the beginning of the heat sealing step pressure is applied over an initial zone along the apex of the wedge. Subsequently the bare (4) is rolled around an axis located near to the apex of the wedge, in the direction shown by the right hand end of arrow (13), to apply heat and pressure over a wider zone located adjacent to the initial zone.

36 Claims, 3 Drawing Sheets

☐ ORIENTED, HIGH SHOCK STRENGHT

▦ ORIENTATION LOST, BUT GOOD STRENGHT (DOUBLING)

▨ ORIENTATION LOST, POOR SHOCK STRENGHT

—·—·— TEFLON-COATED GLASS FABRIC

▨ SEALER BAND

▨ ASBESTOS SUBSTITUTE

▨ METAL BAR

▦ SILICONE RUBBER

HEAT-SEALING POLYMER FILMS

The invention concerns methods of supplying a sandwich of polymer films with a linear heat-seal, the apparatus for carrying out and the products resulting from such methods.

A first aspect of the invention concerns the achievement of a high shock-peal-strength, which in particular is needed when the seal is the bottom or top seal of so called heavy duty or industrial bag, which must be constructed to resist the impact of accidental falls which may occur during transport or storage of the filled bag. In industrialised countries it is normal to request that the filled bag must be able to pass drop cycles on each of its faces from at least 2 m height, while in developing countries, where the treatment of the bags often is much rougher, the requirements are often for 4 m drop height.

A distinction is drawn between "flat" drops, i.e. drops on one of the two major faces, "edge drops" i.e. drops on one of the two minor faces perpendicular to top and bottom, "top drops" and "bottom drops", i.e. drops on to the top and bottom, respectively.

When a filled, heat-sealed bag falls on top or bottom, the shock-action on top or bottom seals is negligible.

"Edge drops" causes a straight peal action on both top and bottom seals.

The panel action by "flat drops" is almost negligible if the bag is a simple "pillow bag" without gussets. However the trend in industrial packaging n bags has for many years been towards use of gusseted bags, now more and more practised by "form-fill-and-seal", which process starts with a gusseted tube from reel and in one machine line in sequence makes the bottom seal, cuts the tube into lengths to make open-mouth bags, fills the bag and makes the top seal.

When a gusseted, filled, heat-sealed industrial bag falls "flat" and without special precautions being taken by the sealing, there occurs a strong bias type of pealing, which also can be described as tearing, in the four spots where the inner-folds of the gussets interact with the heat-seals. This is because the contents of the bag spread cut horizontally by the impact, thereby tearing in the gussets with forces concentrated around the gussets' inner-folds.

This means that the locations in the top and bottom seals where these seals intersect with the gusset inner folds are subjected to particularly strong shock-peel or shock-tear forces. The situation is aggravated by the fact that in these locations the seals are relatively weak due to the change from "2-ply" to "4-ply" bag material.

The conventional way of counter acting this is by two so called "K-seals" in each corner, seals angled at about 45° to the bottom and top, starting in the mentioned spots of intersection and bonding each outer-ply to the adjacent ply in the gusset but without bonding gusset-ply to gusset-ply.

Reverting to the straight shock-peeling occurring during "edge-drops" this is most critical in the "2-ply" parts of the seal where these border on "3-ply" or "4-ply" parts, i.e. the longitudinal seam (if such a seam is present) and at the gussets.

When bags accidentally fall, the velocity by which pealing (tearing) takes place will often exceed 5 ms$^{-1}$. The standardised laboratory tests for heat-seal-strength are carried out at much lower velocities, and I have found them being without any value for evaluation of the practical performance when a bag falls. For this purpose these tests often give directly misguiding results when different polymer materials or different types of seals are compared. For my comparisons I apply a simplified shock-peel test and a simplified shock-tear test at velocity about 5,5 ms$^{-1}$. This test is further explained in the example herein.

When rationally making the (generally linear) top seals and bottom seals in a bag there is always aimed at improved shock-peel strength by promoting swelling through contraction in its plane of the material in the bonded zone and in the immediate adjacent zones of unbonded film material. It is clear that this is needed only on the side of the seal which is predetermined for high shock-peel-strength, i.e. the side adjacent to the contents of the bag. This is conventionally achieved by tapering the edges of the sealing bands or in a similar way making a smooth change between bonded and unbonded zones of the film-sandwich. More precisely, the positive effect of smoothing is that a boundary zone of the heat-seal, which is not bonded, participates in the swelling through contraction in a perpendicular direction to the linear seal. (In my terminology I consider all which has been molten as "seal", not limiting this term to the bonded part of the film-sandwich).

However, with the need for downgauging the film materials for bag making, which is a result of ecological and power saving considerations, there has come and will further come a need for much more efficient increase of shock-heat-seal-peel strength. The first industrial realisation of such downgauging has been based on use of stiffer polymer compositions and of higher degrees of malt orientation, in particular highly melt oriented, coextruded films combining HDPE and LLDPE. A later step in such developments, now being introduced by the industry, combines a similar coextrusion technique with cross-lamination (lamination with main directions of orientation criss-crossing) and subsequent biaxial stretching. A survey over inventions involved in this technology is made in the introduction of WO93/14938.

It is clear that the downgauging in itself means reduced shock-peel strength. In addition this strength strongly depends on the stiffness of the material and as mentioned the downgauging requires the use of increased stiffness which reduces the shock-peel strength even more. The higher the stiffness, the lower this strength. A reason for this is that the shock-peel strength depends on the capability in the material to deform elastically and to deform permanently in the "peel line" instead of rupturing, and to undergo such permanent deformation at a sufficient rate. (if the seal falls by shock-peeling, this is normally due to a rupture and not to "delamination"). Furthermore, the stiffer the film material the lower its capability to take up some of the energy of the shock by elastic elongations in the surroundings of the seal.

Further problems are connected with the orientation, which is an important factor in the downgauging. FIG. 1 illustrates this. The orientation is lost in the seal including its unbonded boundaries. In the bonded part this does not matter, because the thickness has become doubled, but in the unbonded parts the elimination of orientation reduces the shock-strength. (It does not necessarily reduce the strength at lower velocities of peeling, when the material has time to elongate the orient).

A major limiting factor in the downgauging is "flimsiness" of the film which makes bag production or the handling of an unfilled bag difficult. In the above mentioned WO93/1428 I disclose how I strongly improve on this by a special cold stretching method, which produces a waved cross-section with thickened top-portions. In the present set of drawings I show this as a microphoto, FIG. 4. (It concerns the film material actually used in example 1). From this it is immediately understood that this structure, which is needed for a strong downgauging, due to the thickness variations also necessitates an improvement of the structure of the seal. (The thickness differences have no significant influence on the general strength properties of the film, since the thinner portions are stretched more strongly).

In experiments preceding the present invention I have tried to improve on the shock-seal-peel strength by use of flat sealing surfaces placed under an angle of 5–15 degrees to each other with the angle opening towards the side where the peal strength is wanted so as to promote the swelling in this side. This gave very improved results when sealing a film-sandwich of a relatively even thickness, but was insufficient or directly harming in the case of significant thickness variations, e.g. at the change around the inner fold of the gusset in a bag. I believe that an explanation tor this is that such sealing makes a border line, which deviates very much from straightness where there are some thickness variations, and that the straightness of this border is a condition for good shock-peal strength.

In GB-A-943457 there is described a method of heat sealing under shrinkage of polymer films according to the introductory portion of claim 1. Heat and pressure are applied by separate sets of heat seal bars to the first and second pressure zone, and the first set of bars must be withdrawn from the sandwich before the second set is applied.

In a new method according to the invention of heat sealing together at least two films of heat shrinkable polymer material, the heat seal being linear and destinied for high-shock-peal-strength from one predetermined side, the two films are subjected to heat, whereby the material in each film contracts in the plane of the film and swells in thickness, and to simultaneous pressure in a squeezed zone so as to produce a heat seal comprising a bonded zone and, on at least the predetermined side, a non-bonded zone in which the film is swollen, in which in an initial stage heat and pressure are applied over an initial pressure zone constituted by a portion of the squeezed zone including the boundary of the squeezed zone located on said predetermined side, and in a second stage heat and pressure are applied over a second pressure zone which overlaps the initial pressure zone and extends from the boundary of said initial pressure zone opposite the boundary of the squeezed zone located on said predetermine side and includes at least a portion of the rest of the squeezed zone adjacent to the said initial pressure zone and pressure in at least a portion of the initial pressure zone located adjacent said squeezed zone boundary is reduced characterised in that heat and pressure are maintained in said overlap zone from the beginning of the initial stage to the and of the second stage.

In a preferred method in a final stage heat and pressure are applied over a final heat and pressure zone which includes the boundary of the squeezed zone opposite said predetermined side and in which heat and pressure are maintained in at least a portion of the squeezed zone throughout the period from the beginning of the initial stage to the end of the final stage.

The second stage may be a final stage, but preferably the final stage does not immediately follow the first stage, that is the second stage is separate from the final stage. There is preferably a continuous progression from the first through the second and final stages.

Preferably the final pressure zone is wider than the initial pressure zone.

Consequently, the first aspect of the present invention concerns a development of the swelling in the critical part of the seal, which at the same time enables the establishment of a sufficiently straight border line between bonded and unbonded zones. It is characterised by the application of sealing members, which by mutual rolling between a pair of such members can change the width of the strip in the film sandwich, which comes under both heat and pressure, hereby first making a first part of said strip, this first part occupying only a fraction of the final width of the seal and being located at the side predetermined for peeling, and subsequently by the mutual rolling extending the width of the strip and releasing the sealing pressure at said predetermined side.

By the first step of the press a relatively straight border line is established, and by the subsequent part of the process the strong swelling is ensured at the same time as the seal is widened and thereby become able to take high shocks in its longitudinal direction, in particular from the shock-tear when the bag falls flat.

In a preferred embodiment of the method the unbonded but heat-treated and swollen zones of the seal at the side predetermined to resist peeling in the final product, are peeled apart while still adhering to the sealing bars and while the material is still molten (referred to hereinafter as hot-peeling).

Said hot-peeling is preferably carried out to an extent to create in the final product an angle of at least 45° between the innermost surfaces of the two exterior films of the sandwich in the unbonded but swollen zones where these zones border on the bonded zone.

The effects of the hot-peeling are illustrated especially in FIGS. 3a and b, and it is understandable herefrom that it increases the resistance to cold-peeling in the final product.

Furthermore the first aspect of the invention is preferably carried out in such a way that at the end of the sealing process (in the final stage) the highest sealing pressure is applied on the side of the seal opposite said predetermined side. This promotes the swelling of the seal in the side where this is essential (i.e. the predetermined side), and there may even be squeezed molten material from the side where the thickness of the seal is unessential to the side where it is essential.

The present invention preferably involves passage of the polymer material between a pair of sealing members which apply heat and pressure. At least one of the members has a shape adapted so that by mutual rolling the desired effect is achieved. For instance one of the members may be flat and the other may have a generally angular shape so that, when it is rolled a changing width of the material is subjected to pressure and heat.

More specifically, the first aspect of the invention is preferably carried out in the way that the surface of at least one sealing member is generally wedge-shaped, the band which is under both pressure and heat is started as a band including the top of the wedge and a part of both sides of the wedge, and the mutual rolling taking place over the top of the wedge so that after the rolling the heat and pressure is extended to generally the full width of one side of the wedge, and the pressure is generally released from the other side of the wedge.

The apex of the wedge may be curved or flattened. The rolling preferably taken place about the apex or the centre of curvature of a curved apex.

In this manner the initial stage of heat sealing is started with an angle between the two sealing members opening towards the side where high shock-peel strength is wanted, like in the above mentioned "preceding experiments", but in an arrangement which enables an easy adjustment of this angle to obtain for a given film-sandwich the best compromise between straight border line and high swelling.

In order to achieve the above mentioned peeling in the molten state, the polymer composition, sealing temperature and surface of sealing members are preferably adapted to make the surfaces of the film-sandwich stick to the sealing bars also after release of the sealing pressure.

There is preferably made use of auxiliary bars to assist in the hot-peeling action and to ensure release of the sealed film-sandwich from the sealing bars in spite of the intended relatively strong bonding between film material and bars.

As shown in FIG. 2 a practical way of constructing the machinery for the carrying out of the first aspect of the invention is by use of a pair of sealing bars, one sealing bar generally being of wedge-shape, while the other generally is flat and is resilient. The resilience can be achieved in the conventional way shown in this figure, where there is a relatively thin plate of stiff heat and electricity-insulating material ("asbestos substitute") between the heater band and the really resilient material (Si-rubber). This as shown enables the sealing of film-sandwiches of strongly variable thickness, especially bag material including gussets and/or longitudinal seam. Alternatively the resilience can under circumstances the achieved by use of a film of reinforced Si-rubber over the heater band. A similar film of reinforced Si-rubber can under circumstances be used on the wedge-formed sealer bar.

A further development of the method according to the first aspect of the present invention is characterised in that after termination of the sealing the sealing members are further mutually rolled over one or more extensions located to the side of the member portion imposing the second pressure zone opposite the side predetermined for peeling, hereby completely releasing the sealing pressure, said extension being kept at a temperature below the temperature needed for sealing and the extensions being adapted to hold the film sandwich during at least a part of the cooling period so as to avoid or reduce the shrinkage of the seal in its longitudinal direction.

The cooling is preferably carried out by blowing cooling air on at least one surface of the seal during the period of holding.

The use of rolling movement of the sealing members relative to each other in connection with the cooling is a second aspect of the present invention and can be exercised independently of the first aspect.

In this further aspect there is provided a method of heat sealing together at least two films of heat shrinkable polymer material in which the two films are subjected to heat, whereby the material in each film contracts in the plane of the film and swells in thickness, and to simultaneous pressure in a squeezed zone so as to produce a heat seal comprising a bonded zone and, on at least one side, a non-bonded zone in which the film is swollen, heat and pressure being applied by sealing members and the heat seal being linear, characterised in that a step of opening the sealing members consists in rolling the bars relative to each other over extensions of said members on one side of the seal, said extensions being kept at a temperature below the minimum heat sealing temperature and the extensions being adapted to hold the film sandwich during at least a part of the cooling period so as to reduce the shrinkage of the seal in its longitudinal direction.

The invention also comprises the products made by the described methods and the apparatus, details of the construction of which appears from the description of the methods.

Thus apparatus according to the invention includes a heat seal station comprising opposed heat seal members, heating means for heating at least one of the heat seal members, activating means for mutually moving the members towards each other whilst heated and for moving the members away from each other, means for feeding a sandwich of at least two polymer films to the heat seal station so that the sandwich is between the heat seal members and means for moving the heat sealed sandwich away form the heat seal station, characterised in that the heat seal members are adapted to apply simultaneous heat and pressure to the film sandwich between initial member zones over an initial pressure zone on the sandwich and to apply simultaneous heat and pressure to the film sandwich over a second pressure zone on the sandwich which overlaps said initial pressure zone between second member zones which overlap said initial member zones include regions of the heat seal members outside but adjacent to the said initial member zones.

Preferably in the apparatus the heat seal members are adapted to apply simultaneous heat and pressure over a final pressure zone on the sandwich between final member zones.

The at least one heat seal member may be oval in shape whereby the members exert heat and pressure over differing widths of the pressure zones as the oval member is rolled relative to the other member. Preferably the at least one heat seal member is wedge-shaped.

The apparatus may use heat seal bars or may use band-sealing. The latter method is normally used for closing of filled bags. The bag stands on a conveyor belt and is continuously passed through the sealing device. This comprised two endless sealer-bands, usually of thin metal or of teflon coated glass fabric, which bands move with the same velocity as the conveyor belt, grip the top of the bag and carry it past one or more heater blocks while the bands are pressed together. The heat is transmitted through one or both sealer-bands into the sack material and performs the sealing. There may subsequently be cooling elements contacting the bands. There may further immediately under these sealer-bands be moving support belts which grip and convey the top of the sack. In this embodiment of the bands may be substantially flat as a conventional band and the other may be flexible and led past a heat block having a slot shaped to provide a profile in the band.

As regards the products the first aspect of the invention specifically concerns a sandwich of film material supplied with a heat-seal being predetermined for high-shock-peel-strength in one side by swelling through contraction of the material in the bonded zone and in the immediate adjacent zones of unbonded film material on said predetermined side of the seal, characterised in that the swelling in said zones of unbonded film material has at least doubled the thickness of the exterior films of the sandwich within a distance from the border of bonding which distance also at least is the double of the thickness of unswollen film, and that there is an angle of at least 45° between the innermost surfaces of the two exterior films of the sandwich in the unbonded but swollen zones where these zones border to the bonded zones.

This structure is ideal for shock-peel-strength.

WO89/10312 corresponding to U.S. Pat. No. 5,205,650, issued Apr. 27, 1993, discloses patterns of cold embossment for protection of a seam against shock-actions. The pattern referred to in this publication as "shock-absorber-band" absorbs a part of the shock exercised on the seal during "edge drops" of bags, while the pattern referred to as "Gusset Embossment" smooths out the tear forces during flat drops. For optimization of bag drop performance the improvement of the seal itself according to the first aspect of this present invention is preferably combined with such precautions for protection of the seal.

The invention will now be further described with reference to the drawings (to which reference has already been made in the foregoing).

Figure 3A:
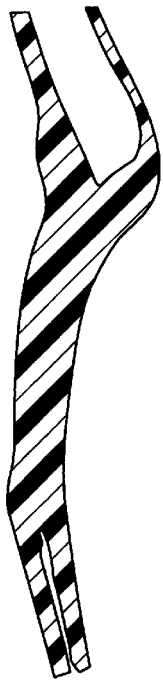

FIG. 3a is a reproduction of a microphotograph in 26 times magnification showing a cross-section of the seal between oriented films in the main part of the seal, i.e. the "2-ply" part. In order to enable the reproduction the microphotograph has been retouched while exactly following the structure presented by the photo. The seal is from the process of the example and the figure therefore serves the double purpose of illustrating and documenting the invention.

Figure 3B:
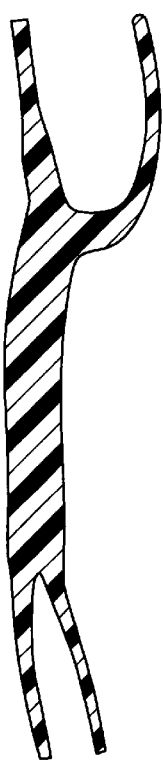

FIG. 3b is a similar reproduction also from the "2-ply" part of the seam and from the process of the example, but the section is cut at about the most critical location of the seam, namely only 1 mm from the intersection with the gusset fold.

Figure 3C:
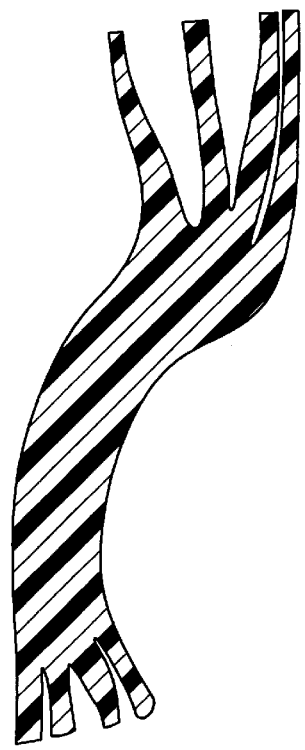

FIG. 3c is a similar reproduction and also from the process of the example, but from the gusset or "4-ply" part of the seam.

Figure 4:

FIG. 4 is a reproduction of a microphotograph in 20 times magnification showing a cross-section of the stretched film used in the example. The purpose of showing this cross-section is for documentation purposes and for explanation of the fact, that FIGS. 3a, 3b and 3c show the films of very different thicknesses also where the films have not been melted and therefore are not swollen.

Figure 5A:
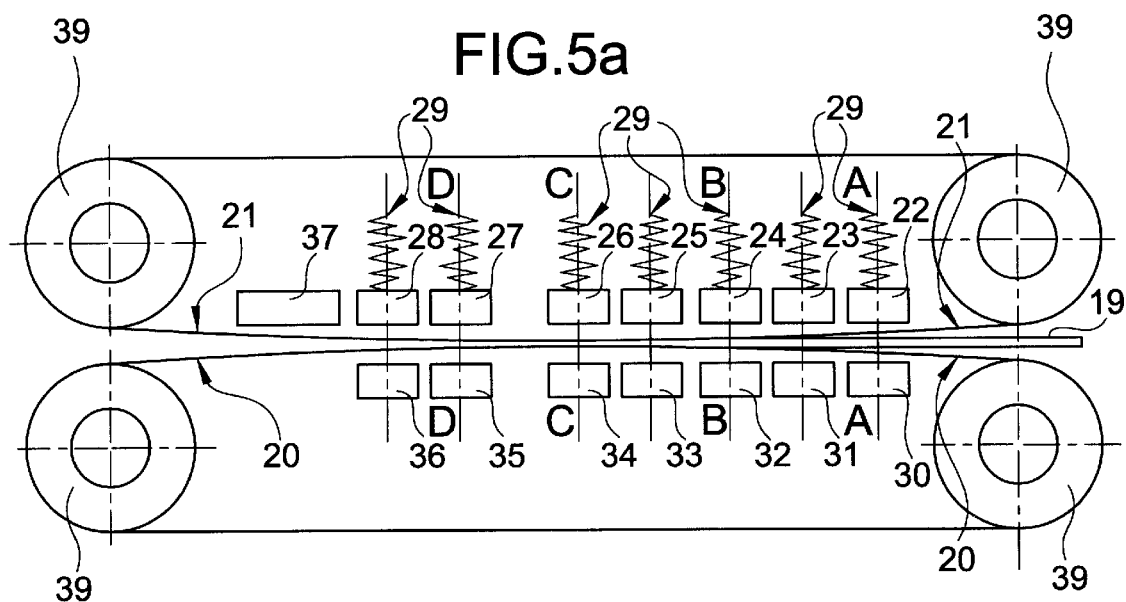
Figure 5B:
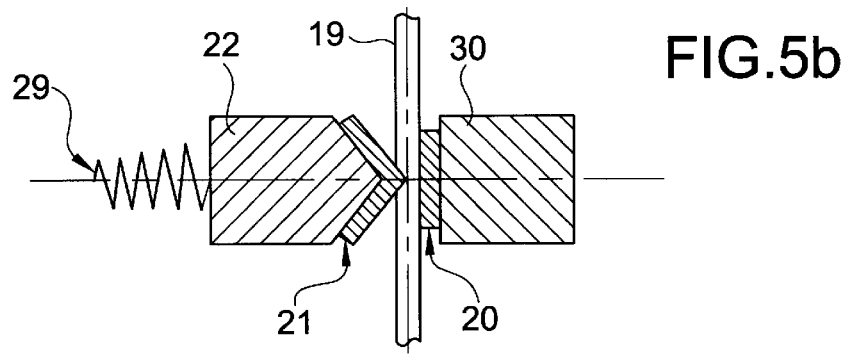
Figure 5C:
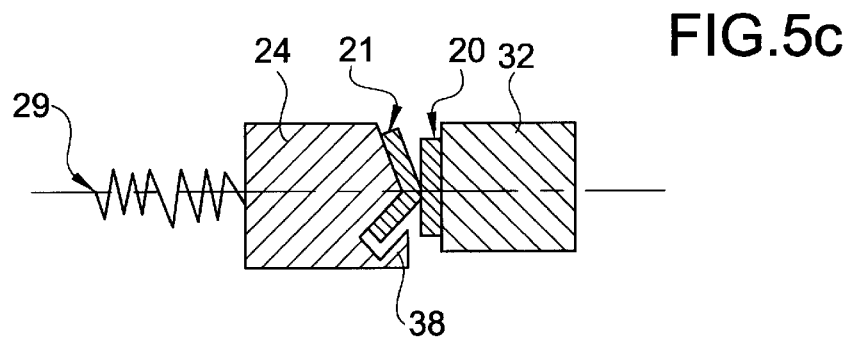
Figure 5D:
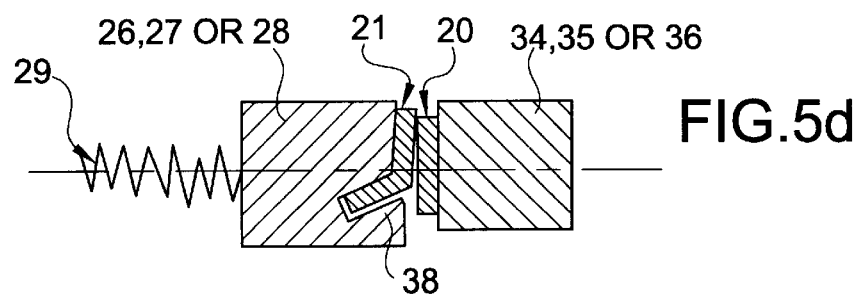

FIG. 5a, b, c and d are sketches of a band-sealer modified to follow the principle of the first aspect of the invention. While FIG. 5a represents the entire process cycle. FIG. 5b shows section A—A of FIG. 5a and FIGS. 5c and 5d show sections B—B and C—C, respectively.

Figure 1:
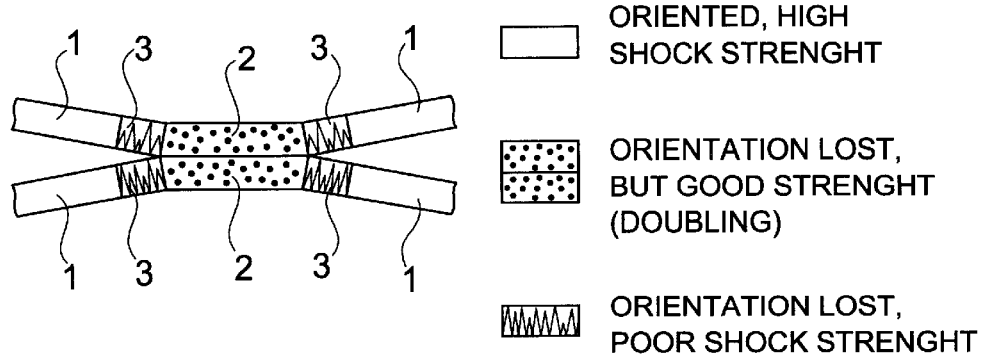
FIG. 1 is a principal sketch of the cross-section of a conventional heat-seal uniting films each of a relatively high degree of molecular orientation. The sketch illustrates a major reason for poor shock-peel-strength when the unbonded parts of the seal have not gained strength by swelling.

In FIG. 1 (1) are the unbonded relatively strongly oriented films of high strength. (2) is the bonded zone of the seal, which has lost orientation but still has the needed resistance to peeling due to the doubling of the thickness. (3) are the unbonded zones of the seal which have lost strength due to loss of orientation and therefore, unless this loss is compensated for by increase of thickness, are susceptible to rupture during peeling, especially at the very border to the bonded zone (2). This becomes more critical as the stiffness the polymer material increases. Furthermore this weakness is aggravated when the border line of the bonding deviates significantly from straightness, since such deviation creates "notch-effects" during the peeling.

Figure 2:
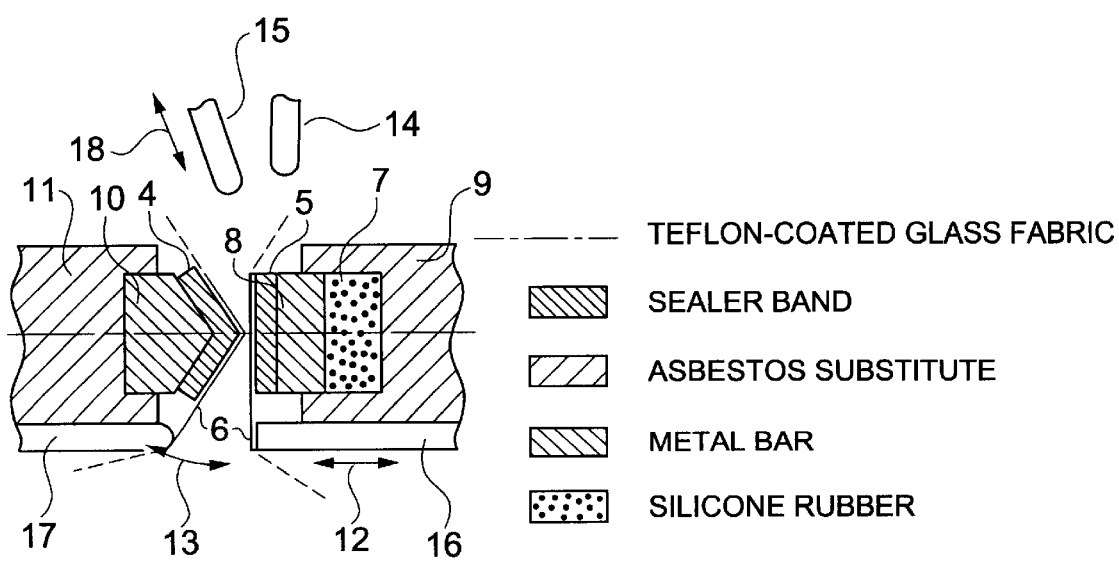
FIG. 2 is a sketch of a preferred apparatus for carrying out the sealing according to the invention.

Apart from the special features connected with the rolling of sealing members relative to each other, the sealing according to the present invention is established with conventional means as impulse or constant temperature sealing. Constant temperature sealing is preferred for practical reasons, but the heating devices can be constructed in the manner, which is normally applied for impulse sealing as shown in FIG. 2. (4) and (5) are electrically heated heater bands (resistance bands), as just mentioned they are preferably kept at a constant sealing temperature. (4) is bent to wedge-from while (5) is flat. Both are covered by teflon coated glass fabric (6) or other sheet material suitable for establishing a not too high and not too low adhesion between sealer bars and molten polymer material. (5) is made part-resilient by use of the Si-rubber band (7) which is protected from the heat by means of the list (8) of asbestos substitute. (7) and (8) are nested in the metal bar (9). This is a conventional arrangement which to some extent absorbs thickness differences. Due to the bent wedge-form, heater band (4) cannot be made resilient in a similar way, however this is not essential. This band is supported and at the same time heat-insulated and thermally insulated by the bar (10) also made from asbestos substitute. The latter is nested in the metal bar (11).

The closing and opening of the sealing jaw is most practically arranged by movement of the sealing bar which is shown to the right, this closing and opening being symbolised by the double arrow (12). The rolling of the sealing bars relative to each other is most practically arranged by rolling of the left sealer bar over the top line of the bent, wedge formed heater band (4) as symbolised by the double arrow (13).

FIG. 2 and this description of the sketch correspond to FIGS. 3a, b and c in the way that the left side of the cross-sections as shown are made with the left side of the apparatus as shown, and the upper end of the seals as shown are made with the upper end of the sealing bars as shown and as now described.

Sealing between two wedge formed sealer bars or one wedgeformed and one flat sealer bar is known per se, therefore it is not difficult for a person skilled in the art to decide on the detailed design of the wedge formed bar. It is clear that the angle between the two sealing surfaces should not be so acute, or the top-edge so sharp, that the film-sandwich is cut instead of sealed. I prefer an angle of approximately 120° between the mentioned two surfaces as shown in the drawing, and a rounding of the top-edge having a radius of about 1 mm. I further prefer a total width of sealing surface on both sealer bars between approximately 4 mm and 10 mm. These indications are of course not meant to limit the scope of the invention.

The abovementioned rounding of the top edge can be established by an exact bending of the sealer band (4). An exact temperature control can e.g. be made by use of thermocouples (not shown), located in cavities in (9) and (11), insulated thermally and electrically from the heater bands by a thin teflon tape and pressed against this tape by a small piece of foamed Si-rubber. Also other conventional method of exact temperature control can be used. In the drawing the two sides of the bent sealer band (4) are shown having equal width. However, if the total width of this band exceeds about 6 mm, it is most convenient that the side here shown as the upper one (i.e. the side where the critical part of the seal is made) is narrower than the other side.

The sealing cycle starts with closing of the jaw (9) by pressing jaw (9) to the left. Preferably it should not end in a locked position but while still under the sealing pressure be permitted some small movement to the right or left under influence of the rolling of the opposite bar. E.g. the closing and opening of jaw (9) can conveniently be established by pneumatic or hydraulic means (not shown). In the first sealing step the wedge-formed bar may be in its symmetrical position as shown in the sketch or may deviate from this. The optimum position depends e.g. on the thickness variations in the film-sandwich and is established by experimentation as a compromise between high swelling of wide zones of unbonded material, and the formation of a straight border line between bonded and unbonded zones of the sandwich.

The sealing cycle starts with closing of the jaw by pressing (9) to the left. Preferably it should not end in a locked position but while still under the sealing pressure be permitted some small movement to the right or left under influence of the rolling of the opposite bar. E.G. the closing and opening of (9) can be conveniently be established by pneumatic or hydraulic means (not shown). In the first sealing position the wedge-formed bar may be in its position as shown in the sketch or may deviate from this. The optimum position depends e. g. on the thickness variations in the film-sandwich and is established by experimentation as a compromise between high swelling of wide zones of unbonded material, and the formation of a straight border line between bonded and unbonded zons of the sandwich.

In the subsequent sealing step the left sealing bar is rolled over the (rounded) top edge of the wedge to a position where mainly the lower parts of the two sealer band (with an outer teflon-coated glass fabric) will be pressed against each other. The device to carry out the rolling are not shown, but can conveniently also be pneumatic or hydraulic means.

For termination of the sealing cycle there are two alternatives. One consists in releasing the seal from the bars by means of the auxiliary bars (14) and (15), which act after opening of the jaw by movement of (9) to the right. The other alternative consists of "overrolling" of the wedge formed sealer bar over the relatively cold extensions 16 and 17, followed by aircooling of the seal and simultaneous release of the latter from the bars also by means of the air flow, and finally opening of the jaw. Both alternatives are illustrated in FIG. 2 although they should normally not be practised together. When practising the first mentioned alternative the film sandwich is located between the bars (14) and (15). Bar (14) is stationary, and in case the seal sticks to the right sealer bar but releases from the left sealer bar when the jaw opens (14) will hold the sandwich back and therefore peel the seal off the right sealer bar. The other auxiliary bar (15) is movable as indicated by the double arrow (18). It is here shown in "waiting position". Its function is to peel the seal off the left (wedgeformed) sealer bar, in case the opening of the jaw releases the seal from the right sealer bar but leaves it sticking to the left one. Therefore bar (15) is mechanically pushed down immediately after opening of the jaw, to a position sufficiently low for the peeling action, and is returned to the "waiting position" before the end of the process cycle. The mechanical means for these movements are not shown but can conveniently be pneumatical or hydraulical means.

Use of auxiliary bars for release of a seal from sealer bars are not customary, since the aim in conventional sealing is to obtain as low a sticking to the sealer bars as possible which therefore calls for the lowest possible temperatures. Contrariwise, in the present invention there is aimed at a particularly high contraction perpendicularly to the length of the seal, which therefore preferably calls for high temperatures, and there is also aimed at a pronounced deformation by hot peeling. Consequently the auxiliary bars are highly advantageous in this aspect of the invention.

In the second alternative for termination of the process cycle, in which the left sealer bar is further rolled over the relatively cold extensions (16) and (17) an air jet preferably from both sides of the film-sandwich releases and cools the seal from both sealer bars. The nozzles for these airjets are not shown but should sit approximately where bars (14) and (15) are shown (the latter as mentioned are normally not used for this alternative method of releasing the seal). The extensions (16) and (17) are interrupted or there is in other way formed passageways for the air to blow through. During this process step the film sandwich is held firmly between (16) and (17) to prevent it from transverse shrinkage.

In the band-sealing process and apparatus shown schematically in FIGS. 5a to d, 19 is the top of the filled bag to be closed by heat-sealing, seen from above. The bag stands on a conveyor belt, and is also supported by a set of belts one on each side of the bag and located immediately under the sealing device. These belt are not shown.

20 and 21 are thin and less bands, preferably made of teflon coated steel. They are driven by wheels 39. All 5 belts and bands are driven at the same velocity.

As it appears from FIGS. 5b to d, 20 is a normal flat band while 21 has the profile of a V, e.g. with a 120 degrees angle between the two arms of the V and with a rounding at the "bottom" of the V. This V-shaped band has a similar function in the concept of the invention as the profiled bar 10 in FIG. 2. It is noted that the band automatically loses its V-shape when passing over a wheel, but recovers it when leaving the wheel.

22 to 26 are heater blocks which are pressed towards the bands by means of the adjustable springs 29. The guiding tracks for this movement are not shown. 30 to 33 are heater blocks in fixed position. Similarly, 27 and 28 are cooling blocks acted on by springs 29, while 39 and 36 are stationary cooling blocks. There are electrical heating elements in the heater blocks and channels for cooling water in the cooling blocks (not shown). The springs 29 are adjusted to set up a suitable sealing pressure.

While the blocks 30–36 have a non-profiled surface facing the bands, blocks 22–28 have a V-shaped surface to match the V-shape of band 21 and with its V in a position adapted to guide a twisting of hand 21. Furthermore, blocks 23–28 have guiding grooves ("pockets") 38 to help taking up the force needed to twist band 21 (see FIGS. 5c and d). The first step of sealing takes place while the bag material passes blocks 22 and 30. The position of the "V" here appears from FIG. 5b. The last step of sealing takes place while the bag material passes blocks 28 and 36, and the position of the "V" here appears from FIG. 5d. The change between these two positions of the "V" takes place in a gradual twisting manner by a gradual change of the surfaces from the beginning of block 23 to the end of block 26. A position on this route, namely corresponding to section B—B, is shown in FIG. 5c.

After the cooling on blocks 27–28 and 35–36, the twist of band 21 is gradually eliminated while this band passes over the longer block 37, the surface of which, in contact with the band, is guiding this gradual untwisting.

Depending on the conditions of sealing, the mentioned but not shown set of conveyor belts immediately under bands 20 and 21 may counteract or even prevent the contraction in molten material perpendicularly to the seal. However, this harmful effect can in any case be completely avoided by supplying the bag material with a slack in the interval between the said conveyor belts and the sealer bands at the inlet to the latter.

EXAMPLE

Scope

This shows (A) the application of the first aspect of the invention for making strong bottom seals in lightweight gusseted tubing, which for stiffening purpose is supplied with thicker "ribs" at about every 2 mm. For comparison seals are made under similar conditions but (B) using only the first step of the sealing procedure in which the wedge formed sealer bar stands on its top-part, and (C) using only the last step of the sealing procedure in which the same sealer bar stands on the entire extension of one surface, with the two sealing surfaces exactly parallel. This is considered a fair imitation of the conventional sealing, in which each heater band is tapered at the edges to allow shrinkage also in the unbonded boundary zone.

Each of the seals are tested by shockpeeling at different locations and by shock tearing which imitates the action on the four intersections between seal and gusset fold when a bag falls flat. Furthermore, the form of the seals are studied by microphotographs.

Apparatus for the sealing

The apparatus shown in FIG. 2 is used, however without the cold "extensions" (16) and (17). The wedgeformed heater band (4) is bent 120° with outer bending radius 1 mm, and the two sides are of equal width as also shown. Heater bands 4 and 5 are each 5 mm wide. Their temperature is controlled within about +/−3° C. The closing and opening of sealer bar 9 and pivoting of sealer bar 10 are carried out pneumatically. Stoppers are adjusted to control that the first step of the sealing is carried out with heater band (4) in its symmetrical position i.e. each of its sides forms the angle 30° with heater band (5), and that the pivoting angle is 37°. Therefore after the pivoting one side of the band (4) forms the angle 67° and the other side 7° with band (5), both angles opening upwards (referring to the positions in FIG. 2). The auxiliary bar (15) is also moved pneumatically.

The gusseted tube

This is made from the cross-laminate described in WO93/24928 example 1, except that in the said example the gauge is 62 and in the present example 80 grams per sq. m., corresponding to 86 micron had the thickness between even and with the further exception that the contents of high mol. wgt. high density polyethylene, which was 52.5% in the old example, now to 60%. Like in the old example most of the rest is lineary low density polyethylene, and the surface layers directly engaged in the heat-sealing ("release/seal layers") form 15% of the weight and consist of plain lineary low density polyethylene.

Briefly repeating information from the old example, the manufacture of this cross-laminate starts with a 3-layer's coextrusion of tubular film, while promoting the melt orientation in the longitudinal direction, proceeds with a helical cutting under 30° angle to achieve bias orientation, and ends with a very special lamination and biaxial stretching procedure, in which grooved rollers are used for the transverse stretching and relatively low stretching temperatures are used. This special procedure procedures the cross-section shown in the microphotograph of FIG. 4.

The thicker "ribs" in the shape of a flat U provide the 80 gram per sq. m. laminate with the stiffness, which is needed for conversion to bags in the usual bag making machines including "form-fill-and-seal" machines, but at the same time the different thicknesses make heat sealing more critical. According to the earlier example, the cross-laminate is finally converted to a gusseted flat tube of gusset width 7–8 cm and a space of 23 cm between the gussets. In this conversion there is made a longitudinal seam under use of melt adhesive.

The sealing procedure (A) following the invention

Both heater bands are constantly kept at the temperature 175° C. The indications of timing below refer to the point when a switch starting closing of the jaw is activated.

At 0.2 sec: closing of jaw reached, sealing pressure 0.30 kilo per cm.

At 0.6 sec: pivoting started.

At 0.8 sec: end position of pivoting reached, pressure increased to 1.2 kilo per cm.

At 1.6 sec: opening of jaw started.

At 1.6 sec: movement of release bar 15 started.

At 2.1 sec: wedgeformed bar pivoted back to starting position, automatic advance of gusseted tube to next sealing position started.

At 2.6 sec: movement back of release bar (15) started.

At 3.0 sec: and of sealing cycle, ready to start next cycle.

First modification of the sealing procedure (B), made for comparison

The procedure described above is modified by setting the opening of the jaws to 0.6 sec, i.e. immediately after the end of the first sealing step. The start of movement of release bar (15) is changed accordingly so that it still takes place 0.3 sec after the start of opening the jaw.

Second modification of the sealing procedure (C), made for comparison

The procedure under (A) is modified by starting the pivoting as soon as the apparatus gives signal that the jaw is closed, i.e. at the time 0.2 sec. No other changes. This means that, disregarding the vary rapid pivoting, the entire sealing is the "second step" under a 7° angle opening "upwards" (in relation to the drawing). The first 0.4 sec of this sealing takes place under the pressure 0.3 kilo per cm and the last 1.0 sec. under the pressure 1.2 kilo per cm.

Although the sealing surfaces are mechanically set to form an angle of 7° to each other, as mentioned under procedure (A), microscopical examinations of cross-sections of the seal show that the sealing surfaces actually have been perfectly parallel, i.e. the sealing is a fair imitation of conventional sealing (the discrepancy between mechanical setting and actual finding is explained some overheating in the "upper part" of the seal in combination with the resilience of sealer bar (8).

Observations of borders between sealed and unsealed zones

The borders are made clearly visible by spreading black ink with a detergent between the plies, and are then observed in microscope under about 5 and about 10 times magnification.

In the samples made according to procedure (A) i.e. according to the invention, and procedure (B) i.e. first step of the invention, the borders appear straight even at the change from "2-ply" to "4-ply" in the critical areas around the inner folds of the gussets. In the samples made according to procedure (C) i.e. without an initial step designed for distinctness, the borders look much more wavy and especially make "jumps" in the mentioned critical areas.

Study of the cross-sectional profile of the seal made according to the invention, i.e. procedure (A)

Reference to the microphotos 3a, b and c which are representative for cross-sections of the seal in the three principally different parts, namely a) the main body of the "2-ply" part;

b) the critical part of the "2-ply" part immediately adjacent to the gusset part; and c) the gusset or "4-ply" part.

The problems where longitudinal seam and heat seal intersect, and immediately adjacent to this intersection, are rather similar to the problems where the seal passes the gussets and immediately adjacent to the gussets.

The microphotos show the strong swelling of the seal, not only in the bonded zones but also in large unbonded boundary zones. In FIG. 3a the upper left branch hand of the unbonded zone of the seal at its thickest location is about 2.5 times the corresponding thickness of the unswollen film. Within a distance from the border of bonding, which distance is the double of the thickness of unswollen film, the swollen unbonded zone still has a thickness which is 2.15 times the corresponding thickness of the unswollen film. In the righthand branch the swelling is still more pronounced, considering that the unswollen material here is much thinner than the unswollen material in the left hand branch. As already explained these thickness differences between various unswollen parts of the film material reflect the "rib" structure, which appears from FIG. 4 and is produced on purpose in order to enhance the stiffness of the material.

The hot peeling has given the cross-sections of the seal including its swollen extension, shape of a heyfork, or in the 2-ply areas, as a Y. In FIG. 3a the angle between the innermost surfaces of the unbonded, swollen film portions, where the latter border on the bonded zones, is about 75°, In FIG. 3b it is about 100°. It is immediately understandable that this significant "forking" contributes to the shockpeel strength of the seal. The cross-sections in each of the three FIGS. 3a, b and c show a slight Z-shape. This is a result of auxiliary bar (15)'s action when it peels the seal off the reinforced teflon cover on heater band (4). However, this slight Z-shape has no influence on the strength of the seal, neither shape has no influence on the strength of the seal, neither positively nor negatively.

Test methods

As mentioned in the introduction bag dropping on edge causes straight shock-peeling of top-seal and bottom seal while flat dropping of gusseted bags causes a biased peel in the intersection spots between seals and inner gusset folds. This type of biased peel will be referred to in the following as the gusset tear. As also mentioned in the introduction, the velocity by which peeling or tearing takes place when a bag falls will often exceeds 5 m per sec, and there does not exist any standardised test method which gives any valid information about the strength of the seal under such conditions. I apply the following method to test the straight shock-peal: I cut 20 mm wide strips perpendicularly to the seal and control in microscope that the cut through the seal is clean. I grip each tongue 35 mm from the seal and give my hands maximum acceleration to tear the specimen. Careful electronical examinations have shown the may hands under these conditions reach the velocity 5.5 m per sec +1–10% relative to each other. If the film strip elongated permanently (orients) prior to rupture, the seal is considered to have passed the test. If the boundary of the seal ruptures without any orientation of the tongues having taken place, the seal has failed the test.

The gusset tear strength is tested in a similar way. One hand grips the gusset fold and the other hand the seal both 35 mm from the intersection spots and the specimen is torn fastest possible, i.e. at 5.5 m per sec ±10%. If hereby there is torn a fissure at the intersection spot, the seal has failed, otherwise it has passed.

Results

"Passed" is indicated as P, "Failed" as F.

(A) as mentioned refers to seals made according to the invention;

(B) to those made by its first step only;

(C) to those made with the same sealing apparatus, but adapted to imitate conventional sealing.

Straight shock-sealing in the main body of the 2-ply part of the seal;

(A) 10P, 0F, i.e. 100%P (B) 2P, 3F, i.e. 40%P (C) 9P, 1F, i.e. 90%P

Straight pealing in the 2-ply part of the seal, one edge of the specimen cut ab. 1 mm or less from the gusset fold;

(A) 10P, 0F, i.e. 100%

(B) 0P, 5F, i.e. 0%P (C) 2P, 8F, i.e. 20%P

Straight peeling in the gusset (4-ply) part of the seal:

(A) 10P, 0F, i.e. 100%P (B) 0P, 5F, i.e. 0%P (C) 5P, 5F, i.e. 50%P

Gusset tear test:

(A) 10P, 0F, i.e. 100%P (B) 0P, 5F, i.e. 0%P (C) 1P, 9F, i.e. 10%P

These results clearly show the efficiency of the present invention.

What is claimed is:

1. A method of heat sealing together at least two films of heat shrinkable polymer material, the heat seal being linear and destined for high-shock-peel-strength from one predetermined side, in which the two films are subjected to heat, whereby the material in each film contracts in the plane of the film and swells in thickness, and to simultaneous pressure in a squeezed zone so as to produce a heat seal comprising a bonded zone and, on at least the predetermined side, a non-bonded zone in which the film is swollen, in which in an initial stage heat and pressure are applied over an initial pressure zone constituted by a portion of the squeezed zone including the boundary of the squeezed zone located on said predetermined side, and in a second stage heat and pressure are applied over a second pressure zone which overlaps the initial pressure zone and extends from the boundary of said initial pressure zone opposite the boundary of the squeezed zone located on said predetermined side and includes at least a portion of the rest of the squeezed zone adjacent to the said initial pressure zone and pressure in at least a portion of the initial pressure zone located adjacent said squeezed zone boundary is reduced characterised in that heat and pressure are maintained in said overlap zone from the beginning of the initial stage to the end of the second stage.

2. A method according to claim 1 in which in a final stage heat and pressure are applied over a final heat and pressure zone which includes the boundary of the squeezed zone opposite said predetermined size and in which heat and pressure are maintained in at least a portion of the squeezed zone throughout the period from the beginning of the initial stage to the end of the final stage.

3. A method according to claim 2 in which the pressure zone in which heat and pressure are applied at any moment in time moves continuously from the said initial pressure zone through said second and said final zones.

4. A method according to claim 2 in which said final pressure zone has a greater width than the initial pressure zone.

5. A method according to claim 1 in which the films on the said predetermined side are peeled apart after said second stage and whilst the material of the films on the said predetermined side of the bonded zone which is swollen is still molten.

6. A method according to claim 5 characterised in that said peeling in the molten state is carried out to such an extent that there is created in the final product an angle of at least 45° between the innermost surfaces of the two exterior films of the sandwich in the said non-bonded zone.

7. A method according to claim 1, characterised in that at the end of the sealing process the highest sealing pressure is applied at the boundary of the seal opposite said predetermined side.

8. A method according to claim 1 in which heat and pressure are applied in the squeezed zone by a pair of opposed sealing members, characterized in that at least one of said sealing members has an angular shape such that upon rolling with respect to said other member a different width of material is subjected to pressure and heat between the members.

9. A method according to claim 8 in which the surface of at least one sealing member is generally wedge-shaped, the initial pressure zone is started as a strip including the top of the wedge and a part of both sides of the wedge, and in the second stage heat and pressure applied in the second pressure zone by mutual rolling between opposing sealing members taking place over the top of the wedge so that after the rolling the second pressure zone is constituted by pressure imposed by the full width of one side of the wedge, and the pressure is generally released from the other side of the wedge.

10. A method according to claim 9 characterised in that the sealing is carried out as impulse—or constant—temperature sealing between a pair of sealing bars, the wedge-shaped sealing member being one of the said sealing bars.

11. A method according to claim 9 or 10 characterised in that while one sealing bar is of a general wedge shape, the other bar is generally flat and is mounted on a resilient support.

12. A method according to claim 9 characterised in that the sealing is carried out by band sealing between a pair of opposed bands and the said wedge-shaped sealing member is one of the sealer bands.

13. A method according to claim 1, characterised in that the polymer composition, sealing temperature and surface characteristics of sealing bars used to apply pressure in said second stage are adapted to make the polymer material at the surfaces of the two films stick to the sealing members also after release of the sealing pressure.

14. A method according to claim 13, characterised in that auxiliary bars are used to release the sealed film sandwich from the sealing members.

15. A method according to claim 1 in which after the application of heat and pressure has formed the said bonded zone and said non-bonded zone the material in the heat seal is cooled while longitudinal shrinkage of the heat seal is minimised by subjecting the films in the zone located beyond the heat seal opposite said predetermined side to a shrinkage-resisting mechanical force.

16. A method according to claim 15 in which the shrinkage resisting force is applied by imposing pressure on the said extensions between opposing members constituted by extensions of sealing members used to apply the heat and pressure, which are at a temperature lower than the minimum heat sealing temperature.

17. A method according to claim 15 or claim 16 in which the material is cooled by blowing cooling air on at least one surface of the seal during the application of the shrinkage resisting force.

18. A method according to claim 16, characterised in that the cooling air flows past the zone of extensions which hold the film-sandwich, the extensions being constructed in an interrupted pattern to allow this flow.

19. A method of heat sealing together at least two films of oriented polymer material in which the two films are subjected to heat, whereby the material in each film contracts in the plane of the film and swells in thickness, and to simultaneous pressure in a squeezed zone so as to produce a heat seal comprising a bonded zone and, an at least one side, a non-bonded zone in which the film is swollen, heat and pressure being applied by sealing bars and the heat seal being linear, characterised in that a step of opening the sealing bars consists in rolling the bars relative to each other over extensions of said bars on one side of the seal, said extensions being kept at a temperature below the minimum heat sealing temperature and the extensions being adapted to hold the film sandwich during at least a part of the cooling period so as to reduce the shrinkage of the seal in its longitudinal direction.

20. Any sandwich of heat-sealable polymer material supplied with a heat-seal made according to claim 1.

21. Heat sealing apparatus including a heat seal station comprising opposed heat seal members, heating means for heating at least one of the heat seal members, activating means for mutually moving the members towards each other whilst heated and for moving the members away from each other, means for feeding a sandwich of at least two polymer films to the heat seal station so that the sandwich is between the heat seal members and means for moving the heat sealed sandwich away from the heat seal station, characterised in that the heat seal members are adapted to apply simultaneous heat pressure and to the film sandwich between initial member zones over an initial pressure zone on the sandwich and to apply simultaneous heat and pressure to the film sandwich over a second pressure zone on the sandwich which overlaps said initial pressure zone between second member zones which overlap said initial member zones and include regions of the heat seal members outside but adjacent to the said initial member zones.

22. Apparatus according to claim 21 in which the heat seal members are adapted to apply simultaneous heat and pressure over a final pressure zone on the sandwich between final member zones.

23. Apparatus according to claim 22 in which the final member zones have a greater width than the initial member zones.

24. Apparatus according to claim 23 in which one of the heat seal members is oval shaped and the other is substantially flat.

25. Apparatus according to claim 22 in which one of the heat seal members is generally wedge shaped and the other is substantially flat and the apex of the wedge and a part of each side of the wedge forms the said initial member zone and in which by rolling the wedge about the apex one of the substantially straight sides of the member can be brought substantially parallel to the other heat seal member to form the second member zone while the other side of the wedge is moved away from the other heat seal member.

26. Apparatus according to claim 25 in which the said other heat seal member is mounted in a resilient support.

27. Apparatus according to claim 21 in which the heat seal members are bars.

28. Apparatus according to claim 21 in which the heat seal members are bands which are movable in a direction which is longitudinal with respect to the bands and in the machine direction of the apparatus.

29. Apparatus according to claim 28 which comprises a set of conveyor belts located below the pair of sealing bands which conveys the polymer material through the heat seal station and which has means for feeding the polymer material into the heat sealing station with slack in the material between the heat sealing bands and the conveyor belts.

30. Apparatus according to claim 21 in which the heat seal station further comprises removal bars to pull film material away from the heat seal members after the heat seal members are moved away from one another to release the heat sealed sandwich.

31. Apparatus according to claim 21 in which the heat seal station includes means for pulling the films of a sandwich apart at one side of the heat seal formed in a film sandwich while the film material is still molten from the applied heat.

32. Apparatus according to claim 21 in which the opposing heat seal members each include at least one extension located beyond the edge of the said second member zone opposite the initial member zone which extensions are adapted to be kept at a temperature below a predetermined minimum heat seal temperature, the apparatus including means for moving the said extensions towards each other to apply a mechanical force on a film sandwich to prevent the sandwich shrinking in a direction along the length of the heat seal members.

33. Apparatus according to claim 21 in which the heat seal station includes cooling means for cooling the material in the heat seal of a film sandwich after the heat seal has been formed.

34. Apparatus according to claim 33 in which the cooling means includes an air blower for directing cool air at the heat seal.

35. Apparatus according to claim 32 in which the said extensions on at least one heat seal member are discontinuous along the member whereby the cooling air may flow part the extensions across the surface of a film sandwich.

36. A sandwich of at least two films of film material having a generally linear heat seal formed of a bonded zone where all of the films are bonded together and non-bonded zones extending from the opposite sides of said bonded zone where the films are separate, said heat seal having high-shock-peel strength along a predetermined one of said opposite sides, said material having an increased thickness resulting from swelling through contraction of the films in the plane thereof in said bonded zone and the immediately adjacent region of said non-bonded zone on said predetermined side, the increase in thickness of the exterior films of said sandwich in said immediately adjacent region of said non-bonded zone being at least twice the unswollen thickness of the films and extending from the contiguous edge of the bonded zone over a distance which is at least twice the unswollen thickness, and the innermost surfaces of the exterior films of the sandwich diverge from one another in the regions thereof immediately contiguous to the bonded zone at an included angle of at least 45°.

* * * * *